(12) United States Patent
Keene et al.

(10) Patent No.: US 11,414,614 B2
(45) Date of Patent: Aug. 16, 2022

(54) PRODUCTION OF FUEL PELLETS

(71) Applicant: University of Kentucky Research Foundation, Lexington, KY (US)

(72) Inventors: Thomas Keene, Lexington, KY (US); Darrell Neal Taulbee, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 16/843,435

(22) Filed: Apr. 8, 2020

(65) Prior Publication Data

US 2020/0325409 A1  Oct. 15, 2020

Related U.S. Application Data

(60) Provisional application No. 62/832,332, filed on Apr. 11, 2019.

(51) Int. Cl.
  *C10L 5/44* (2006.01)
  *C10L 5/36* (2006.01)
  *C10L 5/08* (2006.01)

(52) U.S. Cl.
  CPC .............. *C10L 5/445* (2013.01); *C10L 5/08* (2013.01); *C10L 5/363* (2013.01); *C10L 5/442* (2013.01); *C10L 2200/0469* (2013.01); *C10L 2290/24* (2013.01); *C10L 2290/30* (2013.01)

(58) Field of Classification Search
  CPC .... C10L 5/04; C10L 5/08; C10L 5/363; C10L 5/442; C10L 5/445; C10L 2200/0469; C10L 2290/24; C10L 2290/30; Y02E 50/10; Y02E 50/30
  See application file for complete search history.

(56) References Cited

U.S. PATENT DOCUMENTS

| | | | |
|---|---|---|---|
| 8,753,410 B2 * | 6/2014 | Taulbee | C10L 5/16 44/593 |
| 2012/0317878 A1 * | 12/2012 | Taulbee | C10L 5/04 44/530 |

FOREIGN PATENT DOCUMENTS

DE    102007051680 A1 *  4/2009  ............. C10L 5/361

* cited by examiner

*Primary Examiner* — Latosha Hines
(74) *Attorney, Agent, or Firm* — Stites & Harbison PLLC; Warren D. Schickli

(57) ABSTRACT

A fuel pellet includes a pellet body made from a mixture of (a) hemp byproduct, kenaf byproduct or hemp and kenaf byproduct, (b) sawdust and, optionally, (c) coal fines. The fuel pellet may be made without adding a binder. A method of making the binderless fuel pellet is also described.

20 Claims, 3 Drawing Sheets

PRODUCTION OF FUEL PELLETS

RELATED APPLICATION

This application claims priority to U.S. Provisional Patent Application Ser. No. 62/832,332 filed on Apr. 11, 2019 which is hereby incorporated by reference in its entirety.

GOVERNMENT SUPPORT

This invention was made with government support under Grant No. PON2 127 1900001786 awarded by the KY Energy and Environment Cabinet and USDA Coop. Agreement No. 14-CA011083150-002 awarded by USFS. The government has certain rights in the invention.

TECHNICAL FIELD

This document relates generally to the energy field and, more particularly, to a new and improved binderless fuel pellet as well as to a method of making the same.

BACKGROUND

Freshly cut timber produces a green sawdust with a moisture content comprising as much as 40% or more of the total weight. The cost of adding a binder or thermally drying the sawdust to the range (~8-12 wt %) required for producing wood pellets such as those used in residential pellet stoves or sold into the utility market is often prohibitive. Further, due to its physical nature and flow properties, high-moisture and un-agglomerated sawdust cannot be transported, stored, and fed to a coal-fired utility boiler without significant modification of existing equipment. Therefore, unless the timber mill can find a market for or can burn the sawdust in an on-site combustor, high-moisture sawdust must be either stockpiled or disposed in a land fill. Due to space limitations, the amount of sawdust they can stockpile is limited. Thus timber mills are confronted with transportation and landfill costs, which depending on location, can range from approximately $30/ton to more than $50/ton.

There is currently no market for the hemp byproduct that remains after processing meaning it is also slated for landfill disposal at similar cost.

Producing fuel pellets from blends of sawdust, coal fines, and hemp or hemp byproduct not only avoids potential land fill costs for the sawdust and hemp byproduct waste but importantly, it also allows the sawdust to be transported and utilized in combustors, particularly in coal-fired utility boilers using the existing infrastructure. Further, while burning biomass to produce electricity can qualify for valuable renewable energy credits (RECs), some power producers, due to restrictions sometimes contained in their fuel clause, can only pay for fuels in which a specified minimum of the fuel value derives from a fossil energy source. While fuel pellets made from hemp byproduct and high-moisture sawdust can garner RECs and avoid disposal costs, adding coal fines can provide additional benefits and flexibility. Another improvement is that suitably durable pellets or pucks can be made without the need for the high pressures and frictional temperatures generated during the melting of the sawdust lignin as is common in commercial sawdust-pellet plants. This reduced pressure and friction provides significant cost savings resulting from reduced power consumption and equipment erosion.

SUMMARY

In accordance with the purposes and benefits described herein, a new and improved fuel pellet comprises a pellet body made from a mixture of (a) 10-80 weight percent hemp byproduct, kenaf byproduct or a combination thereof, (b) 1-75 weight percent high moisture sawdust and (c) 0-80 weight percent coal fines.

In one or more of the many possible embodiments, the pellet body is binder free.

In one or more of the many possible embodiments, the pellet body includes 1-50 weight percent coal fines. In one or more of the many possible embodiments, the pellet body includes 10-50 weight percent coal fines. In one or more of the many possible embodiments, the pellet body includes (a) 30-36 weight percent hemp byproduct, kenaf byproduct or combination thereof, (b) 30-36 weight percent high moisture sawdust and (c) 30-36 weight percent coal fines.

In accordance with yet another aspect, a new and improved binderless fuel pellet consists essentially of a pellet body made from (a) 10-80 weight percent hemp byproduct, kenaf byproduct or combination thereof, (b) 1-75 weight percent high moisture sawdust and (c) 0-80 weight percent coal fines.

In accordance with yet another aspect, a new and improved method is provided of making a binderless fuel pellet. That method comprises the steps of: (1) mixing together (a) a hemp byproduct, a kenaf byproduct or a hemp byproduct and a kenaf byproduct and (b) a high moisture sawdust to form a pelleting mixture and (2) compressing the pelleting mixture and forming the binderless fuel pellet in the absence of any added binder.

In one or more of the many possible embodiments of the method, the method further includes mixing coal fines with the (a) a hemp byproduct, a kenaf byproduct or a hemp byproduct and a kenaf byproduct and (b) a high moisture sawdust to form the pelleting mixture.

More particularly, in one or more of the many possible embodiments of the method, the method may include using remnants from both bast fiber and shive remaining following fiber processing of hemp as the hemp byproduct. In one or more of the many possible embodiments of the method, the method may include using waste hemp byproduct following extraction of CBD oil or other cannabinoid oils from hemp.

In one or more of the many possible embodiments of the method, the method may include using coal fines less than 2.54 cm in size and having a moisture content of between 2.5 and 14 weight percent.

In one or more of the many possible embodiments of the method, the method may include using high moisture sawdust ranging in moisture from 18 to 42 weight percent on a total weight basis.

In the following description there are shown and described several possible embodiments of the new and improved fuel pellet and the method of making the same. As it should be realized, the fuel pellet and method are capable of other, different embodiments and its several details are capable of modification in various obvious aspects without departing from the fuel pellet and method as set forth and described in the following claims. Accordingly, the drawing figures and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the fuel pellet and the method and together with the description serve to explain certain principles thereof.

DETAILED DESCRIPTION

Figure 1:
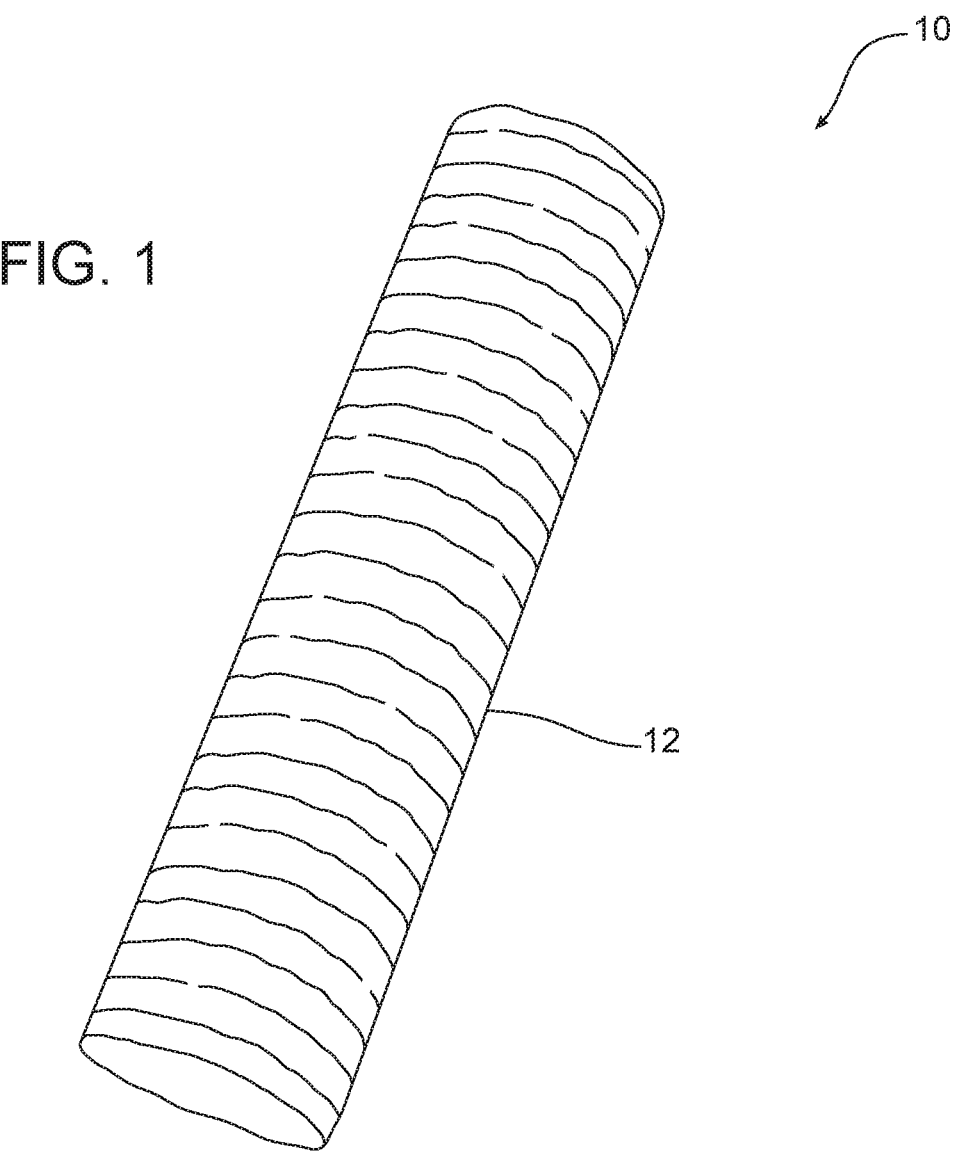
FIG. 1 is a perspective view of the new and improved fuel pellet.

Reference is now made to FIG. 1 which illustrates the new and improved fuel pellet 10. As will become apparent from the following description, the fuel pellet 10 is a binderless fuel pellet: that is a fuel pellet free from the addition of any fuel pellet binder of a type known to those skilled in the art. This substantially reduces the cost of producing the fuel pellet thereby making the fuel pellet a more cost effective substitute for coal.

The fuel pellet 10 is made without requiring pressures and frictional temperatures as high as is common in commercial sawdust-pellet plants. This provides further cost saving resulting from reduced power consumption and lessened equipment erosion.

The fuel pellet 10 also has the structural integrity to be fed into the firebox of the boiler by the existing equipment used to feed coal. As such, it should be appreciated that the fuel pellet 10 is characterized by a number of advantages that make it a commercially competitive product as an alternative fuel source.

The fuel pellet 10 includes a pellet body 12 made from a mixture of (a) 10-80 weight percent hemp byproduct, kenaf byproduct or a combination thereof, (b) 1-75 weight percent high moisture sawdust and (c) 0-80 weight percent coal fines.

For purposes of this document, hemp byproduct includes, but is not necessarily limited to, waste that remains following fiber processing, including remnants from both the bast fiber (outer, stingy material) and the shive or hurd fiber (inner woody, pithy material) and the solid waste that remains following extraction of cannabidiol (CBD) or other cannabinoid oils or a combination thereof.

For purposes of this document, kenaf byproduct includes, but is not necessarily limited to, waste that remains following fiber processing of the harvested kenaf stalks. It can include remnants from both the bast fiber (outer, stringy material) and the shive or hurd fiber (inner woody, pithy material).

In at least one possible embodiment of the fuel pellet 10, high moisture sawdust refers to sawdust with a moisture content of at least 18 percent of total weight (inherent moisture weight plus dry sawdust weight). In at least one possible embodiment of the fuel pellet 10, high moisture sawdust refers to sawdust with a moisture content of at least 40 percent of total weight (at least 67 weight percent on a dry basis). In yet another possible embodiment of the fuel pellet 10, high moisture sawdust refers to sawdust with a moisture content of between 18 and 42 weight percent. High moisture sawdust may include green or mildly-dried sawdust as produced from freshly or recently cut timber including, but not necessarily limited to, from mixed hardwoods.

In at least one possible embodiment of the fuel pellet 10, coal fines includes coal fines of less than 2.54 cm (1.0 inch) in size and having a moisture content of between 2.5 and 20 weight percent.

Significantly, the pellet body may be binder free: meaning no pellet binder of a type known in the art to be useful in the production of fuel pellets needs to be added to the fuel pellet 10 in order for it to have the desired structural integrity to be shipped, stored or fed into a combustor or firebox of a utility boiler by the same equipment used to feed coal.

Significantly, the pellet body may be produced at a pressure lower than that needed to melt lignin as required in most commercial sawdust pellet plants in order for pellet 10 to have the desired structural integrity to be shipped, stored or fed into a combustor or firebox of a utility boiler by the same equipment used to feed coal.

In one or more of the many possible embodiments of the fuel pellet 10, the fuel pellet includes between 1-80 weight percent coal fines. In at least one possible alternative embodiment, the fuel pellet includes between 10-80 weight percent coal fines. In yet another alternative embodiment, the fuel pellet 10 includes (a) 30-36 weight percent hemp byproduct, kenaf byproduct or combination thereof, (b) 30-36 weight percent high moisture sawdust and (c) 30-36 weight percent coal fines.

In one or more of the many possible embodiments, the fuel pellet 10 consists essentially of the physical properties and characteristics noted above. By this, it is meant that the fuel pellet includes all of the ingredients specifically noted above (i.e. hemp byproduct and/or kenaf byproduct, high moisture sawdust and, optionally, coal fines) with any other components known to be useful in fuel pellets, all in the absence of any addition of a fuel pellet binder of a type known to be used for such purpose.

Figure 2:
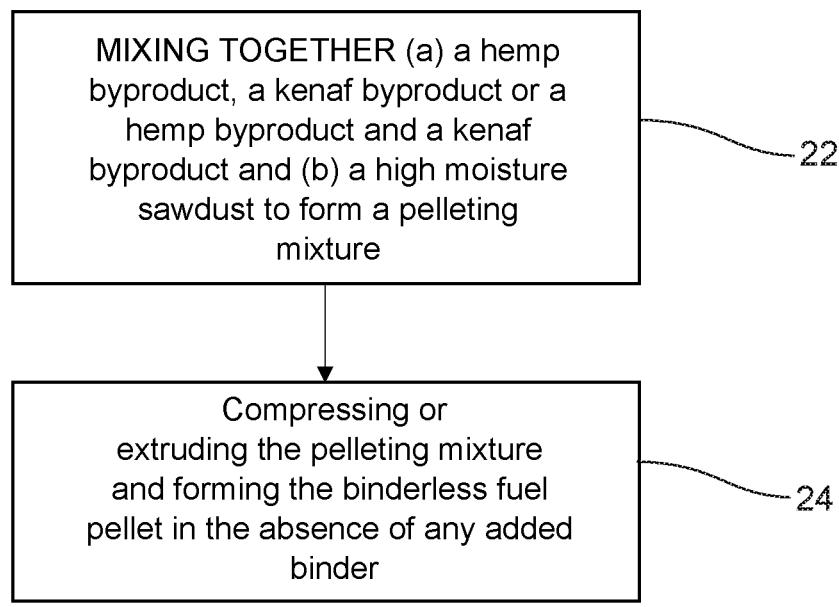
FIG. 2 is a schematic illustration of the method of making or producing the fuel pellet illustrated in FIG. 1.

A method 20 (see FIG. 2) for making the fuel pellet 10 includes the steps of: (a) mixing together (1) a hemp byproduct, a kenaf byproduct or a hemp byproduct and a kenaf byproduct and (2) a high moisture sawdust to form a pelleting mixture (see step 22 in FIG. 2) and (b) compressing or extruding the pelleting mixture and forming the binderless fuel pellet in the absence of any added binder (see step 24 in FIG. 2). The pressure applied generally exceeds 100 psi.

In one or more of the many possible embodiments, the method may include using remnants from both bast fiber and shive remaining following fiber processing of hemp as the hemp byproduct. The method may include using waste hemp byproduct following extraction of CBD oil or other cannabinoids from hemp. The method may include using both of the above as the hemp byproduct. These same types of waste and byproducts are also now available or will be available in those regions that have already or that will legalize medical and recreational marijuana in the future.

In one or more of the many possible embodiments, the method may include using high moisture sawdust derived from sawing timber ranging in moisture content from 18-42 percent on a total weight basis.

Figure 3:
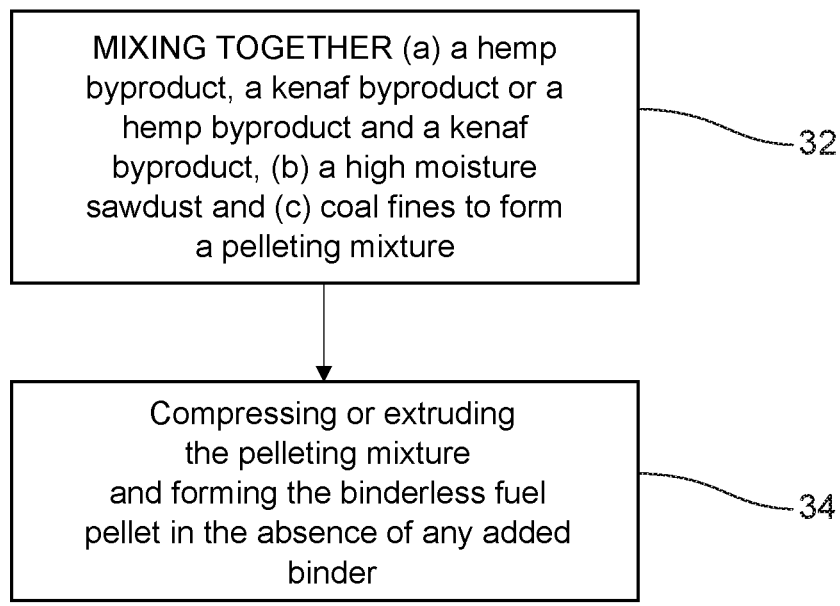
FIG. 3 is a schematic illustration of an alternative embodiment of the method of making or producing the fuel pellet illustrated in FIG. 1.

In one or more of the many possible embodiments of the method, the method 30 also includes (a) mixing coal fines together with (1) the hemp byproduct, the kenaf byproduct or the hemp byproduct and the kenaf byproduct and (2) the high moisture sawdust to form a pelleting mixture (see step 32 in FIG. 3) before (b) compressing or extruding the pelleting mixture and forming the binderless fuel pellet in the absence of any added binder (see step 34 in FIG. 3).

Experimental:

Pellets made with blends of woody and non-woody biomass types. Biomass-only pellets were produced with blends of sawdust and other biomass types that were not wood derived. These included switch grass, two waste byproducts generated during extraction of CBD oil or other cannabinoids from hemp, and a kenaf byproduct. These blends are shown in Table 1. While some formulations clearly produced better quality pellets than others, pellets could be formed with all of the formulations tested despite relatively high rates of green sawdust addition in some cases. The poorest performers were the pellets made with blends of switch grass and green sawdust but even those blends could be improved significantly by adding dry wood shavings.

process also requires less pressure and a lower frictional temperature than commercial sawdust pelletizers as the sawdust lignin does not need to be melted in the current invention in order to produce durable pellets. This results in both reduced energy consumption and less equipment wear. Thus, forming binderless pellets from blends of green sawdust and hemp and/or kenaf waste byproduct helps make such a formulation economically attractive.

TABLE 1

Pellets made with green or kiln-dried sawdust blended with dried wood shavings, switch grass, or a processed hemp byproduct (Percentages are on a weight % basis).

| Run# | Initial Quality | Cured Quality | Green SD$^a$ | Dried SD | Wood shavings | Switch Grass | Hemp1 Byprod | Hemp2 Byprod | Kenaf Byprod |
|---|---|---|---|---|---|---|---|---|---|
| 30-11-3 | Excellent | Very good | 33% | | 33% | 33% | | | |
| 30-11-4 | Very good | ?? | 50% | | 25% | 25% | | | |
| 30-12-1 | Good | — | 50% | | 25% | 25% | | | |
| 30-11-1 | fair | ?? | 50% | | | 50% | | | |
| 30-8-16 | Marginal | — | 53% | | | 47% | | | |
| 30-8-17 | Marginal | — | 24% | | | 76% | | | |
| 30-11-2 | Marginal | — | 67% | | | 33% | | | |
| 30-25-5 | Very good | Marginal | 50% | | | | 50% | | |
| 30-25-3 | Good | Fair | 33% | 33% | | | 33% | | |
| 30-27-6 | Very good | Excellent | | 75% | | | 25% | | |
| 30-25-7 | Marginal | Marginal | | 50% | | | 50% | | |
| 30-25-1 | Marginal | Marginal | | | | | 100% | | |
| 30-36-14 | Very good | | 75% | | | | | 25% | |
| 30-36-13 | Excellent | | 67% | | | | | 33% | |
| 30-36-5 | Excellent | Excellent | 50% | | | | | 50% | |
| 30-36-4 | Excellent | Excellent | | | | | | 100% | |
| 30-36-2 | Excellent | Excellent | 50% | | | | | | 50% |
| 30-36-1 | Good | Marginal | | | | | | | 100% |

Kenaf is a high-yield field crop with fiber properties similar to that of hemp.

Reasonably good pellets were made with the blends of hemp1 byproduct and green sawdust without the need to add other biomass types or binder. However, the best pellets in this series were produced with blends of green sawdust and the hemp2 byproduct and with green sawdust and kenaf* byproduct both of which produced pellets with good to excellent green strengths containing up to 75% green sawdust.

Kenaf as a viable agricultural crop is rapidly gaining interest due to its high-yield fiber production and potential use for energy production. On the other hand, hemp production has undergone an explosive growth over the last 2-3 years and that growth is expected to continue into the foreseeable future. The majority of local hemp processors are processing the hemp to produce CBD oil. The solid residue that remains following extraction of the CBD oil is generally considered a waste byproduct that for the most part is currently either stored on site or landfilled. Not only does this waste residue account for the majority of the pre-extraction weight but it is also a relatively dry material meaning it has a higher net Btu content than green sawdust or other green biomass types. The same is true for the kenaf byproduct that was tested following fiber extraction. Forming binderless pellets from blends of green sawdust and hemp and/or kenaf waste byproduct becomes economically attractive when one considers the significant savings to be gained via avoided landfill costs for the hemp byproducts, the durability of the pellets produced, and that the hemp byproduct is a renewable energy source with the potential to qualify for renewable energy credits. The pellet-making Testing of green sawdust and coal blends. One scenario entails locating a commercial pelleting plant adjacent to a coal fired utility and transporting green sawdust to the plant from the timber mill. Since coal fines have a higher heating value than biomass and pelleting the coal fines would facilitate conveying the fines to the boiler, such a plant would be configured to produce pellets from blends of sawdust and the coal fines that are available at the utility site. Since adding a binder adds significantly to cost, a number of formulations were tested to determine if acceptable pellets could be made without adding a binder. The data in Table 2 shows results of attempts to pelletize binderless blends that contained from 9% to 43% green sawdust with two as-received samples of coal fines. As can be seen, acceptable pellets could not be formed with any of the binderless coal/sawdust blends that were tested.

The next step was to add either a hemp- or kenaf-byproduct to the binderless blends of coal and sawdust. In stark contrast to the results in Table 2, the results in Table 3 show that acceptable pellets formed when the hemp or kenaf byproduct were present at 20 wt % or greater. While of lesser quality, pellets were also formed with as little as 10% hemp byproduct (run #30-26-5, Table 3). While it should be noted that pellets produced in a plant located at the utility site would likely be used right away without the need to be stored, the data in Table 3 indicate the pellets made with both kenaf, and particularly with hemp byproduct, often maintained their integrity as they cured suggesting the pellets may be stored for longer periods of time while maintaining their integrity if needed.

TABLE 2

Testing of binderless blends of green sawdust and coal fines.
Note that pellets could not be produced with any of the green
sawdust/coal formulations tested without a binder.

| Run# | Initial quality | Cured quality | Green SD | Kiln/air dried SD | Wood Shavings | As Rec'd PCC coal* | As Rec'd RT coal* |
|---|---|---|---|---|---|---|---|
| 30-8-7 | — | | 20% | | | 80% | |
| 30-8-15 | — | | 43% | | | 57% | |
| 30-8-12 | — | | 17% | | | | 83% |
| 30-19-5 | — | | 20% | | | | 80% |
| 30-7-1 | — | | 10% | 18% | 17% | 55% | |
| 30-8-8 | — | | 9% | | 9% | 82% | |
| 30-8-9 | — | | 9% | 9% | | 82% | |
| 30-13-1 | — | | 33% | | 33% | 33% | |
| 30-11-5 | — | | 25% | | 25% | 25% | |
| 30-19-5 | — | | 20% | | | 80% | |

Moistures varied somewhat over time but typically, as rec'd PCC –> ~14%, as Rec'd RT –> ~10%

TABLE 3

Binderless pellets made with green sawdust, coal fines, and either a hemp or kenaf byproduct.
Note that in contrast to the results in Table 2, reasonably strong pellets could be formed
when kenaf or hemp byproduct was added to binderless blends of green sawdust and coal.

| Run# | Initial quality | Cured quality | Green SD$^a$ | Air dried SD | Hemp1 byprod | Hemp2 byprod | Kenaf | wet RT coal | Air dried RT coal |
|---|---|---|---|---|---|---|---|---|---|
| 30-26-6 | Very good | Marginal | 20% | 20% | 20% | | | 40% | |
| 30-26-2 | Excellent | Very good | 33% | | 33% | | | 33% | |
| 30-26-4 | Fair | — | 40% | | 20% | | | 40% | |
| 30-25-8 | Excellent | Fair | 33% | | 33% | | | | 33% |
| 30-26-1 | Excellent | Excellent | 33% | | 33% | | | | 33% |
| 30-26-3 | good | Marginal | 40% | | 20% | | | | 40% |
| 30-26-5 | Fair | — | | 41% | 10% | | | | 49% |
| 30-36-6 | Excellent | Excellent | 33% | | | 33% | | | 33% |
| 30-36-9 | Excellent | Excellent | 33% | | | 33% | | 33% | |
| 30-36-3 | Excellent | Excellent | 33% | | | | 33% | | 33% |
| 30-36-10 | Very good | Good | 33% | | | | 33% | 33% | |
| 30-36-11 | Good | Fair | 40% | | | | 20% | 40% | |

$^a$Green Sawdust moisture = 35.1 wt %, air-dried sawdust moisture content = 29.7 wt % (total weight basis)

The finding that acceptable binderless pellets can be made with high-moisture coal fines and 40% or more green sawdust by adding a byproduct from hemp or kenaf processing is quite noteworthy. It is known that two of the biggest obstacles to commercial production of coal/biomass briquettes are binder costs and the need to acquire and use a relatively low-moisture feedstock. Binder costs have been shown in prior studies to be in the range of $15/ton of pelletized product while drying the sawdust or coal fines significantly adds to both capital and operating expense. Thus, in terms of economic viability, the potential impact of avoiding binder and drying costs cannot be over emphasized. The results shown in Table 3 clearly demonstrate that acceptable pellets can be produced without adding a binder and without the need to extensively dry the sawdust or coal fines. Furthermore, making fuel pellets with these three components not only provides a beneficial product with commercial value, it also serves to avoid disposal fees which coupled with the lower pressure and frictional temperature requirements during pellet production makes the process economics even more attractive. Finally, in terms of benefit, such formulations potentially benefit the forestry, coal and agriculture industries while providing an avenue to help meet public demand for renewable energy.

The foregoing has been presented for purposes of illustration and description. It is not intended to be exhaustive or to limit the embodiments to the precise form disclosed. Obvious modifications and variations are possible in light of the above teachings. For example, the fuel pellet may include different weight percentages of components other than those indicated above. Those different weight percentages include, but are not necessarily limited to between 10-75 weight percent high moisture sawdust, between 20-75 weight percent high moisture sawdust, between 30-75 weight percent high moisture sawdust and between 25-45 weight percent high moisture sawdust. All such modifications and variations are within the scope of the appended claims when interpreted in accordance with the breadth to which they are fairly, legally and equitably entitled.

What is claimed:

1. A fuel pellet, consisting of:
   a pellet body made from a mixture of (a) 10-80 weight percent hemp byproduct, kenaf byproduct or a combination thereof, (b) 1-75 weight percent high moisture green sawdust and (c) 0-50 weight percent coal fines wherein the high moisture green sawdust ranges in moisture from 18 to 42 weight percent on a total weight basis and wherein the hemp byproduct includes (a) waste that remains following fiber processing, including remnants from both bast fiber and shive or hurd fiber, (b) the solid waste that remains following extraction of cannabidiol (CBD) or other cannabinoid oils and (c) combinations thereof.

2. The fuel pellet of claim 1, wherein the pellet body is binder free.

3. The fuel pellet of claim 2, including (a) 30-36 weight percent hemp byproduct, kenaf byproduct or combination thereof, (b) 30-36 weight percent high moisture sawdust and (c) 30-36 weight percent coal fines.

4. The fuel pellet of claim 1, including (a) 30-36 weight percent hemp byproduct, kenaf byproduct or combination thereof, (b) 30-36 weight percent high moisture sawdust and (c) 30-36 weight percent coal fines.

5. The fuel pellet of claim 1, including 10-75 weight percent high moisture green sawdust.

6. The fuel pellet of claim 1, including 20-75 weight percent high moisture green sawdust.

7. The fuel pellet of claim 1, including 30-75 weight percent high moisture green sawdust.

8. The fuel pellet of claim 1, including 25-45 weight percent high moisture green sawdust.

9. A binderless fuel pellet, consisting of:
a pellet body made from (a) 10-80 weight percent hemp byproduct, kenaf byproduct or combination thereof, (b) 1-75 weight percent high moisture green sawdust and (c) 0-80 weight percent coal fines wherein the high moisture green sawdust ranges in moisture from 18 to 42 weight percent on a total weight basis and wherein the hemp byproduct includes (a) waste that remains following fiber processing, including remnants from both bast fiber and shive or hurd fiber, (b) the solid waste that remains following extraction of cannabidiol (CBD) or other cannabinoid oils and (c) combinations thereof.

10. The fuel pellet of claim 9, including (a) 30-36 weight percent hemp byproduct, kenaf byproduct or combination thereof, (b) 30-36 weight percent high moisture sawdust and (c) 30-36 weight percent coal fines.

11. A method of making a binderless fuel pellet consisting of:
mixing together (a) a hemp byproduct, a kenaf byproduct or a hemp byproduct and a kenaf byproduct and (b) a high moisture green sawdust to form a pelleting mixture; and
compressing or extruding the pelleting mixture and forming the binderless fuel pellet in the absence of any added binder wherein the high moisture green sawdust ranges in moisture content from 18 to 42 weight percent on a total weight basis and wherein the hemp byproduct includes (a) waste that remains following fiber processing, including remnants from both bast fiber and shive or hurd fiber, (b) the solid waste that remains following extraction of cannabidiol (CBD) or other cannabinoid oils and (c) combinations thereof.

12. The method of claim 11 including mixing coal fines with (a) and (b) prior to the compressing or extruding and the forming.

13. The method of claim 12, including using remnants from both bast fiber and shive remaining following fiber processing of hemp as the hemp byproduct.

14. The method of claim 13, including using coal fines less than 2.54 cm in size and having a moisture content of between 2.5 and 20 weight percent.

15. The method of claim 12, including using waste hemp byproduct following extraction of a cannabinoid oil from hemp.

16. The method of claim 14, including using coal fines less than 2.54 cm in size and having a moisture content of between 2.5 and 20 weight percent.

17. The method of claim 11, including making the binderless fuel pellet with 10-75 weight percent high moisture green sawdust.

18. The method of claim 11, including making the binderless fuel pellet with 20-75 weight percent high moisture green sawdust.

19. The method of claim 11, including making the binderless fuel pellet with 30-75 weight percent high moisture green sawdust.

20. The method of claim 11, including making the binderless fuel pellet with 25-45 weight percent high moisture green sawdust.

* * * * *